(12) United States Patent
Holtmann et al.

(10) Patent No.: US 9,076,280 B2
(45) Date of Patent: Jul. 7, 2015

(54) COMPLETION OF PORTABLE DATA CARRIERS

(75) Inventors: Ludger Holtmann, Hohenlinden (DE); Jorn Treger, Rosenheim (DE); Matthias Jauernig, Munich (DE); Sara Stamer, Garching (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 30 days.

(21) Appl. No.: 13/577,148

(22) PCT Filed: Feb. 3, 2011

(86) PCT No.: PCT/EP2011/000494
§ 371 (c)(1),
(2), (4) Date: Aug. 3, 2012

(87) PCT Pub. No.: WO2011/095337
PCT Pub. Date: Aug. 11, 2011

(65) Prior Publication Data
US 2012/0311681 A1    Dec. 6, 2012

(30) Foreign Application Priority Data
Feb. 5, 2010   (DE) .......................... 10 2010 006 987

(51) Int. Cl.
*G06F 7/04*   (2006.01)
*G07F 7/10*   (2006.01)
(Continued)

(52) U.S. Cl.
CPC ............ *G07F 7/1008* (2013.01); *G06Q 20/355* (2013.01); *G06Q 20/3823* (2013.01); *G06Q 20/388* (2013.01); *G07F 7/0826* (2013.01)

(58) Field of Classification Search
CPC ... G07F 7/1008; G07F 7/0826; G06Q 20/388; G06Q 20/3823; G06Q 20/355
See application file for complete search history.

(56) References Cited

U.S. PATENT DOCUMENTS 6,446,177 B1 *  9/2002  Tanaka et al. ................. 711/163
6,575,360 B1 *  6/2003  Hagn ............................. 235/380
(Continued)

FOREIGN PATENT DOCUMENTS

DE    10107527 A1   9/2002
EP     1722336 A2   11/2006
(Continued)

OTHER PUBLICATIONS

International Preliminary Report on Patentability for PCT/EP2011/000494, Aug. 7, 2012.
(Continued)

*Primary Examiner* — David García Cervetti
*Assistant Examiner* — Khoi Le
(74) *Attorney, Agent, or Firm* — Workman Nydegger (57) ABSTRACT

A method for completing at least one portable data carrier connected to a completion device, wherein a completion data set that is present on the completion device is introduced into the data carrier. A security module is connected to the completion device and different authorization data sets are provided on the security module. The security module includes a management application for managing the different authorization data sets. Each of the authorization data sets exactly specifies one completion, and each of the authorization data sets is exactly associated with one completion data set. The managing application on the security module monitors the completion of the at least one data carrier according to the specification in an authorization data set selected from the different authorization data sets.

14 Claims, 8 Drawing Sheets

(51) Int. Cl.
*G06Q 20/34* (2012.01)
*G06Q 20/38* (2012.01)
*G07F 7/08* (2006.01)

(56) References Cited

U.S. PATENT DOCUMENTS

| | | | |
|---|---|---|---|
| 7,010,684 B2* | 3/2006 | DeTreville | 713/159 |
| 7,036,738 B1* | 5/2006 | Vanzini et al. | 235/486 |
| 7,602,920 B2* | 10/2009 | Hameau et al. | 380/278 |
| 2002/0107798 A1* | 8/2002 | Hameau et al. | 705/41 |
| 2005/0114677 A1* | 5/2005 | Kanai | 713/182 |
| 2005/0269401 A1* | 12/2005 | Spitzer et al. | 235/380 |
| 2006/0031546 A1* | 2/2006 | Breitfuss et al. | 709/231 |
| 2008/0155271 A1* | 6/2008 | Barck et al. | 713/189 |
| 2009/0049525 A1* | 2/2009 | D'Angelo et al. | 726/4 |
| 2009/0067630 A1 | 3/2009 | Daemen et al. | |

FOREIGN PATENT DOCUMENTS

| | | | |
|---|---|---|---|
| EP | 2063400 | A1 | 5/2009 |
| WO | 9919846 | A2 | 4/1999 |
| WO | 0154086 | A1 | 7/2001 |
| WO | 0178020 | A1 | 10/2001 |
| WO | 2005024736 | A1 | 3/2005 |
| WO | 2005119606 | A1 | 12/2005 |

OTHER PUBLICATIONS

International Search Report for PCT/EP2011/000494, Apr. 21, 2011.

* cited by examiner

FIG 1

COMPLETION OF PORTABLE DATA CARRIERS

BACKGROUND OF THE INVENTION

A. Field of the Invention

The present invention relates to a method for completing portable data carriers as well as to a security module and to a system for carrying out such a method.

B. Related Art

Upon the manufacture of portable data carriers, in a first manufacturing step an operating system mask is incorporated into a non-rewritable, non-volatile memory of the data carrier, for example a ROM memory. In a further step, the completion step, the incorporated operating system mask is completed. In so doing, possible errors of the operating system mask are corrected as well as extensions of the operating system are loaded. Furthermore, the possibly corrected and extended operating system is suitably configured. In so doing, corresponding completion data are loaded into a non-volatile, rewritable memory of the data carrier, for example an EEPROM memory. For this purpose, the data carrier is connected with a suitable completion apparatus, on which the completion data are made available.

Before data carriers with operating system mask and associated completion go into series production, smaller test quantities of these data carriers are extensively tested. This is often effected remote from the actual data carrier production in possibly external test departments especially adapted for this purpose. Errors or defects found upon testing are then remedied by adjusted completion data, whereupon new tests are carried out with such data carriers which have been completed with the adjusted completion data.

Since the data carriers to be tested are normally produced, i.e. in particular are completed, in only very small quantities, the possibly multiple completion thereof significantly hinders the flow of the other series production, i.e. of the completion of data carriers with entirely tested operating system components. Series production is designed for and optimized to the manufacturing of large series. Outsourcing the completion of small test series, for example to the corresponding external test departments, involves the risk of still secret completion data being misused. Likewise, it is possible that instead of limited test series, larger quantities of data carriers are completed with the completion data or that completed data carriers are not properly configured.

EP 1 722 336 A2 describes a method for generating initialization data for a security data carrier. Therein, a security module, for example a USB token, is made available, on which secret data for generating the initialization data are stored. The security module can further be adapted to receive input data and to generate the initialization data by means of its own routines and using the secret data. However, in the EP 1 722 336 A2 there is neither described the way in which initialization data producible or produced in such a way can be incorporated in a secure manner into corresponding security data carriers, nor how the free use of the generated initialization data can be properly restricted.

SUMMARY OF THE DISCLOSURE

It is the object of the present invention to make possible the completion of in particular small quantities of portable data carriers in a simple, effective and simultaneously entirely controllable manner.

The present invention relates, among other things, to a method for completing at least one portable data carrier connected with a completion apparatus. In so doing, a completion data set present on the completion apparatus is incorporated into the data carrier. According to the invention, for this purpose, a security module is connected with the completion apparatus. On the security module different authorization data sets are made available. Besides, the security module comprises a management application for managing the different authorization data sets. Each of the authorization data sets specifies exactly one completion. Furthermore, each of the authorization data sets is associated with exactly one completion data set. The management application on the security module monitors the completion of the at least one data carrier in accordance with the specification in an authorization data set selected from the different authorization data sets.

The management of the authorization data sets on the security module by the management application comprises in particular the incorporation of new authorization data sets, the blocking or deleting of already present authorization data sets, which for example are replaced by new authorization data sets, as well as various status queries regarding currently present authorization data sets. The method according to the invention thus does not exclude that there is present, at least temporarily, only one authorization data set on the security module, which is suitable to specify a completion. Usually, however, the security module comprises, as described, a plurality of different authorization data sets for specifying different completions by means of a security module.

A specification of a completion comprises here in particular information on a corresponding completion data set, a data carrier to be completed and/or a security module to be used which monitors this. Also the number of admissible completions as well as the configuration of a completion can be predetermined by the authorization data set. The specification can comprise further predeterminations relating to the completion. An authorization data set thus determines substantially entirely the completion to be carried out, by preferably at least specifying who may complete which data carriers how often with which data in which way at what time with which auxiliary means. An authorization data set can thus also be regarded in a certain sense as a form of control or steering data, since not only entities authorized to complete are predetermined, but it is preferably also defined how the authorized entities have to proceed, which actions are excluded, and the like.

The management application on the security module monitors the completion by data necessary for the completion being made available only by the management application with recourse to the selected authorization data set. Such data can be for example secret data for the authentication against the data carrier to be completed or check data for checking a configuration of a completed data carrier. Insofar, a completion of the data carrier without the management application on the security module and deviating from the specification through the selected authorization data set is not possible. The management application thus constitutes a kind of control or steering application, whereby this rather involves a passive, indirect form of steering, however.

In accordance with the method according to the invention, a completion of portable data carriers can be delegated. The completion therefore no longer necessarily has to be effected directly at the manufacturer of the data carriers, but for example at an external test department, a customer of the manufacturer or the like. Incorporating completion data into the data carrier can be carried out there monitored by the security module. The completion of small test series thus does not further block the completion process of the large-volume series production with already extensively tested completion data at the data carrier manufacturer. This ensures a simple and effective completion process both for large-scale production at the data carrier manufacturer and for small test series at the external body.

Furthermore, it is guaranteed that the external body can make only such completions which are specified by corresponding authorization data sets. Therefore, it can be prevented for example that secret completion data are spied out, that a non-admitted number of data carriers is completed with certain completion data, that the completion data are employed beyond a predetermined validity period and the like. By the security module being able to manage different authorization data sets, which in turn are respectively associated with different completion data sets, a flexible completion of different portable data carriers with different completion data and using only one security module is possible. Here it is left to that body which makes available the security module having the management application as well as the authorization data sets, normally the original manufacturer of the data carrier, to predetermine in detail all the parameters which specify a delegated completion of portable data carriers, and insofar to gaplessly monitor and, where appropriate, to restrict or prevent the corresponding completion.

A security module according to the invention for monitoring the completion method according to the invention is adapted to be connected with a completion apparatus. The security module comprises a management application executable thereon. The security module is further adapted to take up different authorization data sets. Here, each of these authorization data sets specifies exactly one completion and is associated with exactly one completion data set on the completion apparatus. The management application is adapted to manage the different authorization data sets on the security module. The management application is further adapted to monitor the completion of the at least one portable data carrier according to the specification in one authorization data set selected from the different authorization data sets.

A system according to the invention for completing at least one portable data carrier comprises a completion apparatus. On the completion apparatus there is made available an auxiliary application. The system further comprises a security module with management application, according to the invention, connected with the completion apparatus, as well as at least one portable data carrier to be completed, which is also connected with the completion apparatus. Furthermore, part of the system are different authorization data sets as well as different completion scripts which respectively comprise a completion data set as well as completion commands for incorporating the completion data set into a data carrier. Each authorization data set is associated with exactly one completion script and specifies exactly one completion. The auxiliary application on the completion apparatus is adapted to incorporate the different authorization data sets into the security module. Furthermore, the auxiliary application is adapted to incorporate, by executing such a completion script which is associated with one authorization data set selected from the different authorization data sets, the completion data set comprised by the completion script into the at least one data carrier. The management application here is adapted to monitor the completion according to the specification in the selected authorization data set.

Hereinafter there will be described advantageous realizations and developments of the previously illustrated basic principle of the invention that is defined in the independent claims. With the present invention it is technically expedient, despite the fact that several features are possibly summarized in individual dependent claims, to put the basic principle of the invention in concrete terms separately by each individual feature mentioned hereinafter, although the respective feature is possibly only claimed in connection with further features. The disclosed advantageous realizations insofar go beyond the claimed embodiments.

As a completion apparatus there can serve within the framework of the delegated completion for example a simple personal computer or the like. But also the use of industrial completion machines or comparable apparatuses is possible. The quantities of data carriers to be completed are usually very small, so that a high data throughput and a high completion speed are subordinated. The completion apparatus must only comprise corresponding interfaces, so that it can be connected with the security module and a data carrier to be completed.

As portable data carriers to be completed especially chip cards of different form factors and embodiments come into consideration. Preferably, the cards are based on the Java Card technology. For connecting such chip cards with the completion apparatus, a corresponding reading device is needed, which can be part of the completion apparatus or itself can be suitably connected with the completion apparatus. Other designs and realizations of the portable data carrier are also possible, for example as a memory card or the like.

The security module, too, can be present in any design, for example as a chip card or, however, as a USB token. According to a preferred embodiment of the invention, the security module is constructed as a chip card with a Java-based operating system and is adapted to execute so-called Java-Card applets. So, the security module in particular comprises at least one non-volatile, rewritable memory, for example a FLASH or EEPROM memory, as well as a processor for executing applications stored in the memory. Depending on the design of the security module, the completion apparatus must have a further interface for connecting with the security module or be connectable with a corresponding reading device.

The management application preferably is an application which is stored in a memory of the security module and executable on a processor of the security module. Preferably, the management application is constructed as a Java-Card applet which is executable on a security module in the form of a Java Card. As described in detail below, the management application normally is personalized and supports various security mechanisms.

Both the authorization data script and the completion script serve to automate the completion method. The scripts can be created by means of any suitable scripting language, for example by means of "Groovy" or the like.

If the data carrier to be completed and the security module are constructed as chip cards according to ISO 7816, the communication of these elements can be effected with the corresponding reading devices via so-called APDUs ("application protocol data units"). Accordingly, the scripts comprise, in connection with such data carriers or security modules, commands in the form of APDUs. The management application on the security module as well as the data carriers to be completed recognize and support the respective commands. Here, there are employed both known standard commands and proprietary APDUs developed especially for the use according to the invention.

The auxiliary application on the completion apparatus is provided for executing the authorization data script and the completion script. I.e., the intelligence and flexibility of the method lies in the scripts, but not in the auxiliary application. This can be seen as an interface between an operator of the completion apparatus, the management application on the security module and the data carrier to be completed. The auxiliary application can therefore be universally used to complete many different data carriers by means of many different completion scripts, without having to be respectively adjusted thereto. Nevertheless, the auxiliary application or a similar mechanism for the completion method is of central significance, because it can establish a connection between the management application on the security module and the portable data carrier to be completed, and the completion script can be executed only by the auxiliary application. Preferably, the auxiliary application is also based on Java, but can also be programmed in any other suitable language.

As indicated above, a selected authorization data set uniquely specifies a completion data set to be incorporated upon the completion into a data carrier to be completed, for example by uniquely associating a completion script with the authorization data set. The completion script, which normally is made available on the completion apparatus, comprises the corresponding completion data set as well as completion commands for incorporating the completion data set into the data carrier. Thus, the completion script associated with the authorization data set predetermines in particular the completion data set to be incorporated. The specification of the completion data set or of the completion script comprising the completion data set is preferably effected via a naming convention, i.e. the authorization data set as well as the completion script associated therewith have uniquely identical name components from which the association with each other can be read. Alternatively or additionally, the authorization data set can comprise a check value, which has been derived from the associated completion data set or the associated completion script, for example a hash value. Via this check value the completion script can then be uniquely identified. The provision of such a check value makes it possible to recognize whether the completion data set or the completion script have been modified without authorization.

The completion data are then incorporated into the data carrier within the framework of the method according to the invention, preferably by the completion script associated with the selected authorization data set being executed by the auxiliary application on the completion apparatus. This means in particular that the auxiliary application only has interface character and does not have to make available own commands for incorporating the completion data set.

A completion is respectively entirely specified by one of the different authorization data sets which are managed on the security module. Such a specification comprises a number of predeterminations which have to be observed upon the corresponding completion so that this completion is admitted by the management application on the security module. As described in detail below, different parameters relating to a completion can be exactly predetermined by means of the corresponding authorization data set specifying this completion.

Normally, the security module is personalized before it is issued or made available, for example by means of a unique identification number. Any body that receives a security module for the delegated completion of portable data carriers can thus be identified or addressed via the identification number in the security module. In the same way, the management application on the security module is personalized with the identification of the security module and in this way bound to the security module. This ensures that the management application is used only in connection with the security module provided therefor and only by that body for which the respective security module has been made available. Further, it can be ensured that a completion script which is provided to be employed for completing portable data carriers under the monitoring of a certain, first security module cannot serve to support a completion of data carriers under the control of another, second security module.

When in the following, and already hereinabove, one speaks of a selected authorization data set or only of an authorization data set, this respectively refers to an authorization data set from the quantity of different authorization data sets on the security module, which has been selected to monitor a concrete completion of a portable data carrier in accordance with the method according to the invention.

A selected authorization data set specifies, as already indicated, the concrete security module which can monitor a completion according to the authorization data set and thereafter release the corresponding completion on the completed data carrier, on the one hand. This is done preferably by the authorization data set comprising information uniquely identifying the security module, for example an identification number of the security module. The authorization data set is only made available in suitable fashion on the security module, for example stored at a corresponding place on the security module, when the security module matches the corresponding predetermination in the authorization data set. In this way it is ensured that a specific authorization data set is employable only on exactly those security modules or at exactly those bodies for which there have been made available corresponding security modules which are predetermined as admitted security modules in the authorization module. A use of the authorization data set on other security modules not stated in the specification of the authorization data set, is thus effectively prevented.

Furthermore, a selected authorization data set specifies a portable data carrier, which may be completed according to the specification in the authorization data set. A corresponding completion of the data carrier, i.e. an incorporation of completion data as well as a configuration of the completion is only effected when the data carrier matches the specification in the authorization data set. A data carrier can be denoted for example via a hardware identification associated therewith. Normally, this hardware identification is the same for all of the data carriers of a batch, which comprise an identical operating system mask in their ROM memory. A data carrier can further be indirectly specified by in the authorization data set being contained secret data relating to the data carrier. Such secret data can be for example secret keys or the like, which in the course of the completion method are required for example for the authentication against the data carrier or for setting up a secured data communication with the data carrier. Therefore, only when these secret data in the authorization data set match the corresponding secret data of the data carrier to be completed, there can be carried out a completion in the first place. When the opposite is the case, this completion already fails in the first steps, for example upon the authentication of the completion apparatus or of the auxiliary application against the data carrier. This provides an example of the fact that the monitoring of the completion by the management application on the basis of a selected authorization data set usually does not constitute an active monitoring, steering or control of the completion method, but rather happens indirectly by necessary data being made available only to authorized entities or entities turning out to be authorized by being compatible with or suitable for the data necessary for the method that are made available by the management application.

Preferably, a selected authorization data set further specifies how many portable data carriers may be completed by means of the specified completion data set. Also a period of time within which a completion has to be effected can be predetermined in the authorization data set. Only when a corresponding maximum number of completions has not yet been reached, or when the predetermined period of time still lasts, a completion can be carried out. In this way, it can be ensured that only a provided number of data carriers, as specified by the authorization data set, can be completed. For this purpose, the management application can manage on the security module for example a corresponding counter which is decremented after each completion carried out according to the specifications. By means of the expiration date there can be ensured that there are always employed only current and not, accidentally, outdated completion scripts.

Preferably, to the external body, to which the completion of the portable data carriers is delegated, there is made available in advance, as mentioned, the auxiliary application executable on the completion apparatus, the security module with the management application as well as a number of not yet completed portable data carriers. If then there is present a new completion data set, with which the data carriers are to be completed for example for testing purposes, this can be effected according to the following steps: An authorization data script is created. This comprises an authorization data set which substantially entirely predetermines, as described in detail above, the completion to be carried out. The authorization data script further comprises at least one command. By means of this command the authorization data set can be incorporated, as explained below, into the security module. Furthermore, there is created a completion script which comprises the completion data set as well as the completion commands already explained above. According to the unique association of the authorization data set with the completion data set, the authorization data script and the completion script are uniquely associated with each other. The authorization data script and the completion script are then transmitted to the completion apparatus. This transmission can be effected for example by e-mail, but also any other kind of transmission is possible. These steps are carried out by that entity which controls the entire completion process, normally the manufacturer of the data carriers.

The authorization data set is then transmitted by the completion apparatus to the security module, by the auxiliary application on the completion apparatus executing the authorization data script. As already described in the context of the completion script, the auxiliary application only acts in an executive manner, i.e. does not make available commands on its own, but only executes the command or commands of the authorization data script so as to effect the transmission of the authorization data set to the security module. In a further step, the auxiliary application executes—as already mentioned—the completion script so as to incorporate the completion data set into the portable data carrier. Both transmission steps, however, are normally preceded by a number of further steps which guarantee the security of the entire completion system and which are described in detail in the following.

Preferably, the authorization data set as well as the completion script are encrypted prior to the transmission to the completion apparatus. This prevents that these security-relevant data are spied out or even changed during the transmission. While the authorization data script as such can remain unencrypted, because it comprises the encrypted authorization data set, the completion script normally is entirely encrypted, i.e. the completion data set together with the completion commands. Therefore, no information on the completion commands can come into unauthorized possession.

The completion script is decrypted after it has been received by the auxiliary application on the completion apparatus, by the auxiliary application itself. Preferably, the auxiliary application is the only entity which possesses the key for decrypting the completion script. Thus, employing the auxiliary application within the framework of the completion method is absolutely necessary. Only after the decryption the completion script can be executed by the auxiliary application so as to incorporate the completion data set into the data carrier. A completion script intercepted during the transmission to the completion apparatus is therefore worthless to an attacker, because he cannot decrypt it and neither can gain the completion data set nor the completion commands.

By contrast, the encrypted authorization data set is decrypted only after the transmission to the security module by the management application on the security module. The auxiliary application can still effect the transmission of the encrypted authorization data set to the security module, since it can readily execute the per se unencrypted authorization data script. If an attacker eavesdrops on the transmission of the authorization data script, he can readout the security-relevant authorization data set only in encrypted fashion. It is also possible to encrypt the authorization data script as a whole, i.e. already encrypted authorization data set together with command(s), prior to the transmission to the completion apparatus, with the same key as the completion script before. Then the auxiliary application first had to decrypt, prior to the transmission of the authorization data set encrypted with a separate key, the authorization data script and then execute it. The authorization data set which in all circumstances had to be kept secret is, as mentioned, encrypted with a separate key, which is present only in the management application on the security module. Equipping the management application with this secret key for decrypting an authorization data set can be regarded as a further—indirect—step of the personalization of the security module. This key is securely managed there and cannot be read out even by the body carrying out the completion of the data carriers. Thus, the authorization data set is securely protected at any time from unauthorized spy out or change.

At this point it becomes apparent that authorization data sets and completion scripts uniquely associated therewith are managed independently of each other. The management of the different authorization data sets, starting with the decryption by the management application on the security module, is effected entirely by the management application and exclusively on the security module. The management of the different completion scripts, however, is carried out by the auxiliary application on the completion apparatus, which decrypts the scripts upon receiving and subsequently manages them, for example first stores them at a predetermined location in a memory of the completion apparatus. Only when a concrete data carrier is to be completed, there is selected an authorization data set which specifies the completion and thereby monitors it. For this authorization data set there is then determined the associated completion script which is subsequently executed by the auxiliary application.

During such a completion process, security-related data are transmitted between the security module and the data carrier to be completed via the auxiliary application on the completion apparatus, with which both the security module and the data carrier are connected. To guarantee the integrity and secrecy of these data, it is necessary that the auxiliary application authenticates itself against the security module at the beginning of the method. There can also be provided an authentication of the auxiliary application against the data carrier to be completed. Furthermore, the data communication between the auxiliary application and the security module runs, during the largest part of the completion method, in a secured manner, for example encrypted. For this purpose, there is, preparatory, set up a secure communication channel between the management application on the security module and the auxiliary application on the completion apparatus. In a similar way, a secure communication channel between the auxiliary application on the completion apparatus and the portable data carrier to be completed is established. Thus, the data transmission can also be securely executed between the completion apparatus and the data carrier.

An authentication of the auxiliary application against the security module can be effected by means of a password. The body to which the completion is delegated receives this password, when the security module is made available. The password is only valid for the one security module, which has been personalized for the corresponding body per identification number. For establishing a secured communication channel between the auxiliary application on the completion apparatus and the security module, then secret keys can be derived from the password. These keys are at no time known to the body carrying out the completion. Deriving and securely managing these keys are tasks of the auxiliary application. These keys are not accessible outside the auxiliary application. Insofar, a secured data communication with the security module, which is required for various steps of the completion process, can be effected exclusively via the auxiliary application. Also in this way it is ensured that a completion process cannot be carried out without an interaction, according to the invention, of the various components, here of the security module and of the auxiliary application on the completion apparatus.

Secret data, which are required for authenticating the auxiliary application on the completion apparatus against the data carrier, are made available to the auxiliary application by the management application on the security module. This can be done by secured means, because, as mentioned, a secured data communication between the security module and the auxiliary application is already guaranteed. For authentication against the data carrier, to the auxiliary application there is made available, on request, by the management application on the security module an authentication value, which is determined by the management application by means of data stored in the authorization data set. Secret keys for establishing a secure communication channel between the auxiliary application on the completion apparatus and the data carrier are also made available by the management application on the security module. For this purpose, the authorization data set comprises a special basic key of the data carrier, from which the secret keys necessary for establishing the secure channel can be derived.

A completion of a data carrier is further predetermined by the selected authorization data set by also the configuration of the data carrier being exactly specified. It is possible to configure two data carriers which comprise an identical operating system mask, for example in the ROM memory, as well as an identical completion data set, for example in the EEPROM memory, in different ways. Insofar, a predetermination of the intended configuration is a substantial part of the specification in the authorization data set. The configuration is released, only when, after the incorporation of the completion data set, the effected configuration of the data carrier is effected in the way predetermined by the authorization data set—only in this way the data carrier becomes operational for further use. Such a release can be effected by a release command, which the data carrier receives from the auxiliary application. This command can comprise configuration check data which entirely define the intended configuration of the data carrier, for example in the form of a check value. A corresponding check value is calculated by the data carrier over the current configuration. Only when both check values match, the completion including configuration is released.

Before the incorporation of the completion data set into the data carrier to be completed this data carrier is individualized. This step is usually carried out by commands of the completion script. This first checks whether or not the data carrier has already been individualized. Here it is to be noted that a batch of identically designed data carriers is normally not individualized before the completion, each data carrier of the batch thus has the same batch number. The batch number is employed for calculating the authentication value for authentication against the data carrier. So as to for example prevent that a total completion process of a data carrier is abusively "recorded" and subsequently can be carried out in the same way for any number of identically designed data carriers of the same batch with the same authentication value, the actual completion process, i.e. the incorporation of the completion data set into the data carrier, is preceded by an individualization step. The incorporation of the completion data requires for itself, as mentioned, an authentication against the data carrier. Thus, for a completion of a data carrier according to the invention an authentication individual for each data carrier is required. For the individualization of the data carrier, which is also called pre-initialization, the batch number of the data carrier is replaced by its serial number. The serial number of the data carrier is individual for each data carrier. Accordingly, as of this point in time also the authentication value for authentication against the data carrier, which is calculated by means of the serial number that now takes the place of the batch number, is individual for each data carrier. This change of the batch number can be regarded as an upstream completion and requires as such also an authentication against the data carrier to be individualized. This can be effected for an entire batch, however, with a merely batch-specific authentication value which thus can be part of the completion script. Such an individualization can be omitted, if a respective data carrier has already been individualized, because for example it has already been completed in a previous production cycle, but this earlier completion is now to be replaced by a new completion.

DESCRIPTION OF THE DRAWINGS

The present invention will hereinafter be described by way of example with reference to the attached drawings. Therein are shown.

DETAILED DESCRIPTION OF EXEMPLARY EMBODIMENTS

Figure 1:
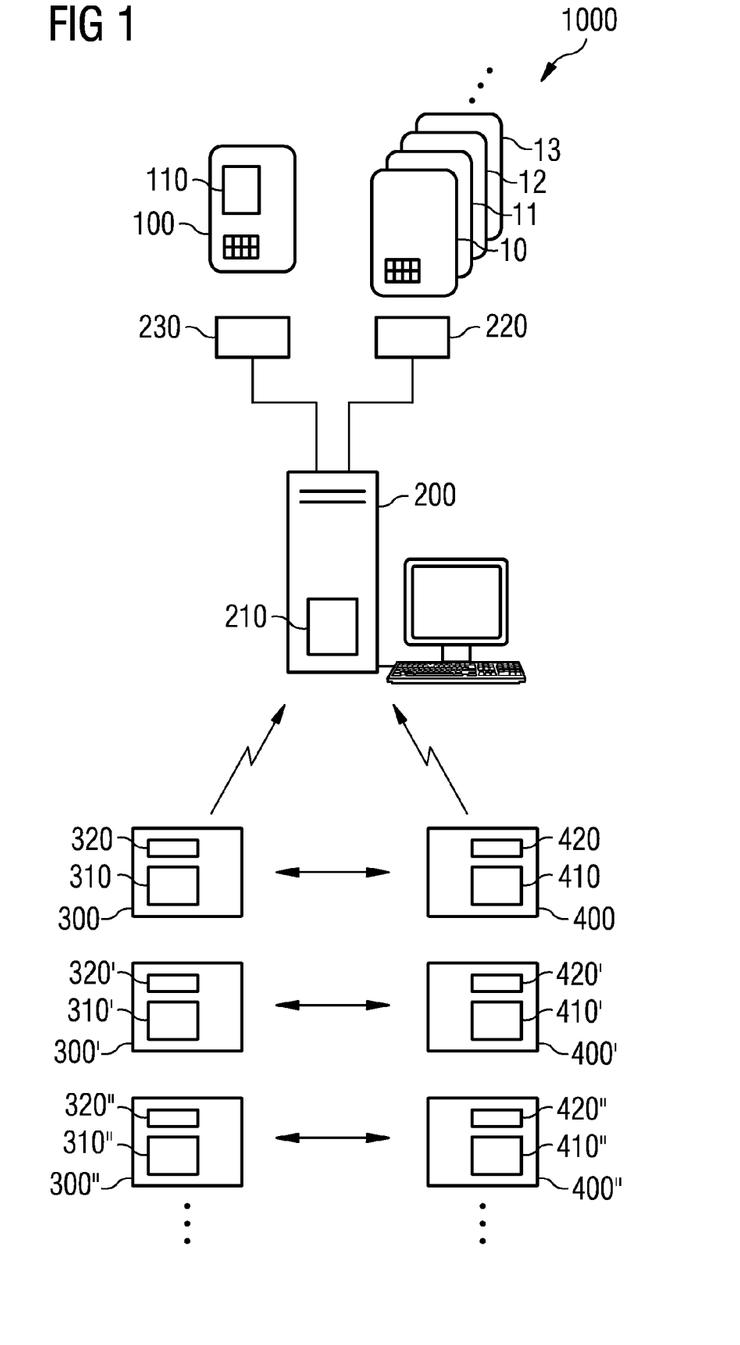
FIG. 1 components of a preferred embodiment of a system according to the invention.

With reference to FIG. 1, a completion system 1000 comprises a completion apparatus 200, for example in the form of a personal computer (PC), a security module 100, different authorization data scripts 400, 400', 400", different completion scripts 300, 300', 300" as well as data carriers 10, 11, 12, 13 to be completed.

The completion apparatus 200 comprises suitable interfaces 220, 230 in order to be connected with the security module 100 as well as with a data carrier 10 to be completed.

The interfaces 220, 230 can be constructed for example as chip card reading devices, when the security module 100 and the data carriers 10, 11, 12, 13 to be completed are constructed as chip cards. On the completion apparatus 200 there is installed an auxiliary application 210, which in the completion method described in detail below plays the role of an interface between a user of the completion apparatus 200, the security module 100 and a data carrier 10 to be completed. The auxiliary application 210 is adapted to execute the authorization data scripts 400, 400', 400" as well as the completion scripts 300, 300', 300" which are described below. The completion apparatus 200 is further connected to a network, for example the Internet. Via this network the completion apparatus 200 can receive data, such as for example the completion scripts 300, 300', 300" and the authorization data scripts 400, 400', 400".

The security module 100 is constructed as a portable data carrier, for example as a chip card, in particular as a Global-Platform Java Card. Alternatively, the security module 100 can also be constructed e.g. as a USB token or the like. On the security module 100 there is installed in executable fashion a management application 110. By means of this management application 110 different authorization data sets 310, 310', 310" yet to be described are managed in the security module 100. Further, the management application 110 is adapted to monitor the completion method described below.

A portable data carrier 10 to be completed, for example also in the form of a Java Card, comprises a ROM memory (not shown), into which an operating system mask has already been incorporated, as well as a rewritable, non-volatile memory (not shown), for example a FLASH memory or an EEPROM memory, into which during the completion method described below completion data 310 are written. By means of these completion data 310 possible errors in the ROM mask are remedied. Further, during the completion by the completion data 310 the operating system of the data carrier 10 is suitably supplemented as well as configured and for the first time booted.

A completion script 300, 300', 300" comprises a completion data set 310, 310', 310" and completion commands 320, 320', 320". By means of these commands 320, 320', 320" the completion data set 310, 310', 310" is incorporated during the completion method into a data carrier 10, 11, 12, 13 to be completed. The completion script 300, 300', 300" is here, as described below, executed by the auxiliary application 210 on the completion apparatus 200.

Finally, an authorization data script 400, 400', 400" comprises an authorization data set 410, 410', 410" as well as at least one command 420, 420', 420" for incorporating the authorization data set 410, 410', 410" into the security module 100. For this purpose, the command 420, 420', 420" is also executed by the auxiliary application 210 on the completion apparatus 200 in a way still to be described. An authorization data set 410, 410', 410" is respectively uniquely associated with a completion data set 310, 310', 310" and respectively specifies a completion. I.e. in the authorization data set 410, 410', 410" there are predetermined all substantial parameters of a completion process, as this will be exactly described in the following with reference to FIGS. 2 to 8.

The completion method described here has been developed so that it is possible for a completion process to be delegated to an external body different from the manufacturer of the data carriers 10, 11, 12, 13 to be completed. Such an external body can be for example an external department of the manufacturer or a close customer. In this way, the production flow at the actual manufacturer is not impaired by the completion of small test amounts of data carriers. The security measures made available, in particular the security module 100 having the management application 110, as well as the authorization data sets 410, 410', 410" managed thereby permit the manufacturer, despite the delegation of the completion, to keep full control over all completion steps and completion results. Finally, on account of the provided cryptographic protection of the delegated completion method, all security-relevant completion scripts 300, 300', 300" and authorization data sets 410, 410', 410" are always secured and neither to be viewed nor to be changed by an unauthorized body.

Figure 2:
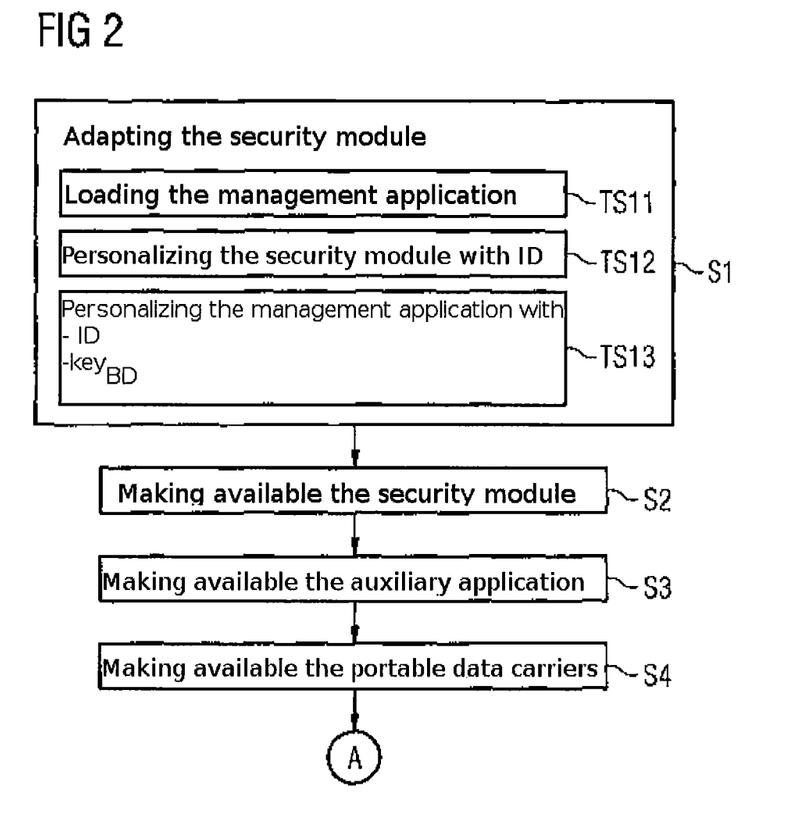
FIGS. 2 to 8 steps of a preferred embodiment of the method according to the invention for completing portable data carriers.

With reference to FIG. 2, preparing steps for the completion method are described. In step S1, the security module 100 is prepared. For this purpose, in substep TS11, the management application 110 is loaded into the security module 100 in order to be executable there. The security module 100 is then, in TS12, personalized by it being provided with a unique identity number ID. By means of this identity number each external body which receives such a security module 100 for external completion can be uniquely addressed. Finally, also the management application 110 on the security module 100 is personalized in substep TS13: With the identity number ID of the security module 100, on the one hand, and with a cryptographic key$_{BD}$, on the other hand. Through the personalization with the identity number ID of the security module 100, the management application 110 is bound to the security module 100, can therefore be employed only in connection with the uniquely marked module 100 which has the same ID, but not with an identically designed other security module. The key key$_{BD}$ serves, as described below, for decrypting authorization data sets 410, 410', 410" received in encrypted manner by the management application 110.

A such prepared security module 100 is made available to the external body in step S2.

In step S3, to the external body there is further made available the auxiliary application 210. This is to be installed on the completion apparatus 200.

As described in the following, the completion method cannot be carried out without the auxiliary application 210, and neither without the security module 100.

In step S4, the external body finally receives a number of data carriers 10, 11, 12, 13 to be completed. Normally, these are data carriers of an identically designed batch, which so far have not been completed. But it is also possible that individual or all of the data carriers 10, 11, 12, 13 made available have already been completed in a previous production phase and now are to be completed anew for testing purposes, for example for improvement or error correction of the operating system.

Figure 3:
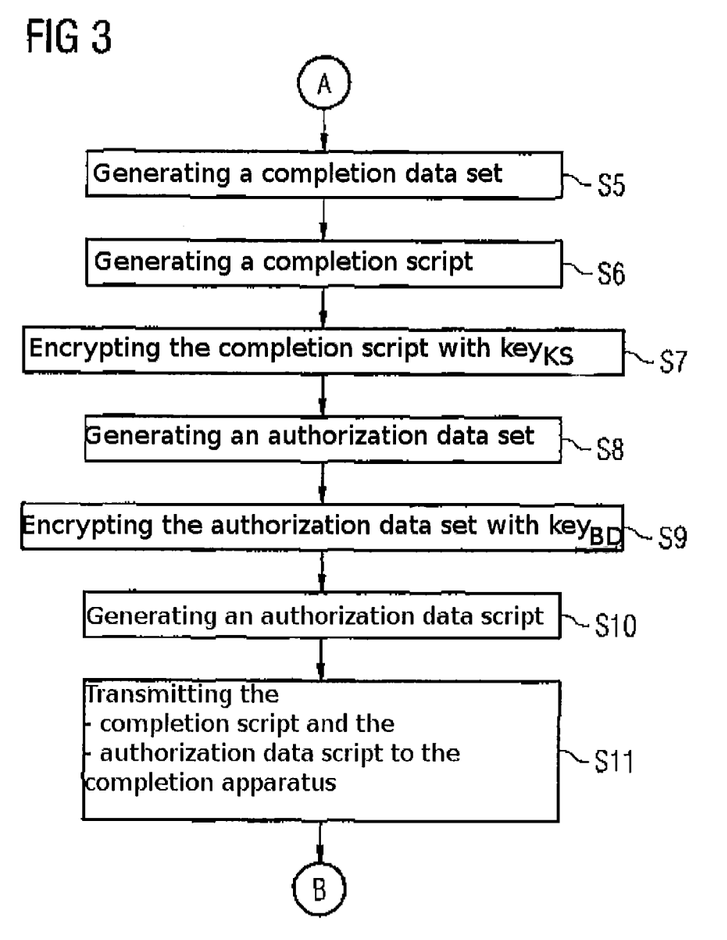

In the steps described with reference to FIG. 3, completion data and authorization data are generated and transmitted to the external body. These steps are always carried out by the manufacturer of the data carriers to be completed when a new completion version is present, so e.g. a completion data set 310 for supplementing an operating system of a data carrier 10.

In step S5, a new completion data set 310 for completing a portable data carrier 10, 11, 12, 13 is generated. This completion data set 310 can be a further development of a previous version of completion data or, however, a new or first development. The completion data set 310 comprises exactly those data which are to be incorporated into a memory of a data carrier 10, 11, 12, 13 to be completed. For this purpose, normally, commands are necessary by means of which the completion apparatus 200 communicates with the data carrier 10, 11, 12, 13 so as to transmit the completion data 310 to the data carrier 10, 11, 12, 13.

Corresponding completion commands 320 are thus also generated and, in step S6, together with the completion data set 310 edited to a completion script 300. This completion script 300 thus comprises both completion data 310 to be incorporated into the data carrier 10, 11, 12, 13 and commands 320 required therefor, and this already in an arrangement and order so that the commands 320 merely have to be executed, as predetermined by the script 300, by the auxiliary application 210 of the completion apparatus 200. The completion script 300 can be generated in any suitable scripting language, for example by means of Groovy. If the data carrier 10, 11, 12, 13 and the security module 100 are constructed as chip cards according to ISO 7816, the completion commands 320 for communication with these two elements are made available in the form of APDUs ("application protocol data unit"). Known standard commands but also newly developed, proprietary commands can be used here.

In step S7, the generated completion script 300 is encrypted with a transmission key $key_{KS}$. In this way, it is protected against spy out or change upon the subsequent transmission to the completion apparatus (see step S11), which can then be effected via a not secured network, for example by e-mail via the Internet.

In step S8, an authorization data set 410 is generated. This comprises a substantially entire specification of a completion. This authorization data set 410 is uniquely associated with the completion data set 310 which has been generated in step S5. Such an association is effected by both the authorization data script 400 (see step S10) and the completion script 300 comprising identical name components, through which these scripts 300, 400 respectively can be uniquely identified, addressed and associated. An association of the completion script 300 with the authorization data set 410 can further be effected by the authorization data set 410 comprising a check digit specifying the completion script 300, for example a hash value over the entire completion script 300. In this way, during the method, the management application 110 on the security module 100 can not only recognize the completion script 300, associated with the authorization data set 410, as such, but can also check it as to any—undesired—changes.

The authorization data set 410 can comprise, among other things, the following data:
A unique identifier of the authorization data set 410 itself.
A unique identifier of the completion data set 310.
A hardware ID of a data carrier 10, 11, 12, 13 completable by means of the completion data set 310. Such a hardware ID is normally identical for identically constructed data carriers 10, 11, 12, 13 of a batch. The management application 110 on the security module 100 later uses this hardware ID during the course of the completion method in order to check whether a present data carrier 10, 11, 12, 13 may be completed with a present completion data set 310, i.e. the authorization data set 410 does not only define the admissible completion data set 310, but also the type of data carrier 10, 11, 12, 13 which may be completed therewith.
Different cryptographic keys for authentication against and establishment of a secure communication channel to a data carrier 10, 11, 12, 13 to be completed. By means of these keys the authorization data set 410 specifies— indirectly—a data carrier 10, 11, 12, 13 to be completed, because if these keys are not appropriate for a data carrier 10, 11, 12, 13 to be completed, an intended completion process will fail already because an authentication against the data carrier 10, 11, 12, 13 will not be successful.
An identification number ID of a security module 100 which may be employed for completing a data carrier 10, 11, 12, 13 to be completed. The authorization data set 410 thus further predetermines, besides the completion data set 310 and the data carrier 10, 11, 12, 13 to be completed, who may carry out this completion: Only the body which is in possession of a security module 100 uniquely marked with the ID.
An expiration date which indicates how long the authorization data set 410 is valid. Thereafter, the management application 110 on the security module 100 will block the authorization data set 410 within the framework of the management of the different authorization data sets 410, 410', 410" stored therein.
A completion number which predetermines how often a completion specified by the other parameters may be carried out. After each successful completion according to the authorization data set 410, the completion number which can be provided as a counter is reduced accordingly. If this counter reaches zero, the authorization data set 410 is also blocked by the management application 110.
A check digit—as already described above—over the completion script 300.
A check value which uniquely predetermines an admissible configuration of a data carrier 10, 11, 12, 13 to be completed. Only when the data carrier 10, 11, 12, 13, after the completion data set 310 has been incorporated, has been configured according to this predetermined configuration, the completion is considered to be successful. This check value, too, can be constructed as a hash value.
Information on authorization data sets to be blocked. In this way, it is possible for example to indicate to the management application 110 on the security module 100 that the present authorization data set 410 replaces a previous authorization data set which is already present on the security module 100. The earlier authorization data set, which for example has specified a completion according to a previous version of a current completion script 300, is then blocked by the management application 110 within the framework of the management of the different authorization data sets 410, 410', 410" on the security module 100.

The above, non-exhaustive list makes it clear that by means of predeterminations in the authorization data set 410 made by the manufacturer of the data carrier 10, 11, 12, 13 to be completed all aspects of a completion delegated to an external body can be uniquely defined and determined. In this way, the manufacturer will continue to have full control over the effected completion of the issued data carriers 10, 11, 12, 13.

In step S9, the authorization data set 410 is encrypted by means of a further key $key_{BD}$ and thus secured against spy out and change upon the subsequent transmission (see step S11) to the completion apparatus 200. A decryption of the authorization data set 410 is effected only directly on the security module 100 by the management application 110. This has been equipped for this purpose with the corresponding key upon the personalization (cf. TS13).

Analogous to step S6 with reference to the completion data 310, in step S10 there is generated an authorization data script 400. This comprises, besides the encrypted authorization data set 410, at least one command 420 which, when executed by the auxiliary application 210 on the completion apparatus 200, directly leads to the transmission of the encrypted authorization data set 410 to the security module 100. A separate encryption of the authorization data script 400 itself is normally not necessary, because the at least one command 420 does not constitute a security-relevant date. By contrast, the commands 320 of the completion script 300 are considered to be security-relevant and are encrypted together with the completion data 310 which also are to be secured (see S7).

As already indicated on several occasions, the encrypted completion script 300 as well as the authorization data script 400 with the encrypted authorization data set 410 are subsequently transmitted, in step S11, to the completion apparatus 200, for example over the Internet. There, the actual completion process can be started, which hereinafter is described with reference to the FIGS. 4 to 8. Each time a new or updated completion data set 310 is present, the steps S5 to S11 can be repeated in the described way.

If a data carrier 10, 11, 12, 13 to be completed is connected via the interface 220 and the security module 110 is connected via the interface 230 with the completion apparatus 200, the actual completion process is initiated, as it is described with reference to FIG. 4.

To make it possible for the subsequent completion process, wherein also security-relevant data are transmitted, to be cryptographically secured, certain security measures are necessary. The completion method is continued in step S12 by the auxiliary application 210 authenticating itself against the management application 110 on the security module 100. This is done by means of a password which is known to the user of the completion apparatus 200.

Subsequently, in step S13, between the auxiliary application 210 and the management application 110 there is set up a secure channel. The secret keys necessary therefor are derived by the auxiliary application 210 in substep TS131 from the password, without the user of the completion apparatus 200 entering into the possession of these keys—thereby it is simultaneously ensured that this user can employ the security module 100 and the management application 110 running thereon always only in connection with the auxiliary application 210, but not separately therefrom. By means of the secret keys, finally, in substep TS132, the secured communication connection to the security module 100 is established.

Figure 5:
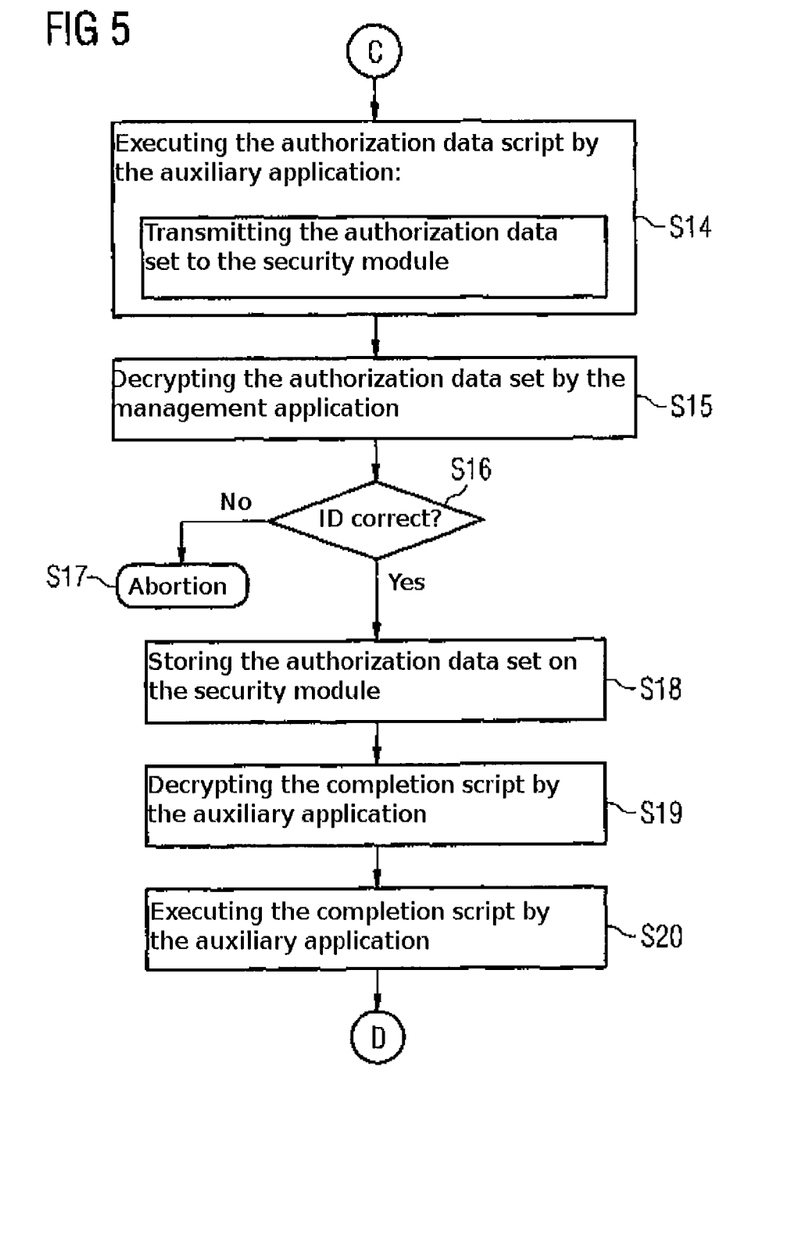

In the environment secured as described hereinabove, there can now take place, as shown in FIG. 5, in step S14, a transmission of the authorization data set 410 to the security module 100. For this purpose, the auxiliary application 210 executes on the completion apparatus 200 the authorization data script 400.

On the security module 100 the authorization data set 410 is decrypted by the management application 110 by means of the key $key_{BD}$ in step S15. Then, in step S16 it is checked whether the security module ID predetermined in the authorization data set 410 matches the ID of the security module 100. Only when this is the case, the authorization data set 410 is stored in the security module 100 in step S18. Otherwise, the completion process is aborted in step S17.

In step S19, the auxiliary application 210 then decrypts on the completion apparatus 200 the received completion script 300.

Only when the authorization data set 410 has been stored on the security module 100, the completion process can be continued by the—now decrypted—completion script 300 being executed by the auxiliary application 210, as this is indicated in step S20.

The execution of the completion script 300 by the auxiliary application 210 is initiated by a user of the completion apparatus 200 selecting the authorization data set 410 associated with the completion script 300, which authorization data set is stored on the security module 100 besides other authorization data sets 410', 410" possibly already stored there. I.e., only when there is stored on the security module 100 an authorization data set 410, 410', 410" which is uniquely associated with a completion script 300, 300', 300" present on the completion apparatus 200, the corresponding completion script 300, 300', 300" can be executed by the auxiliary application 210. Also at this point, it becomes apparent that the entire completion method can only be carried out with the interaction of the described components.

Figure 6:
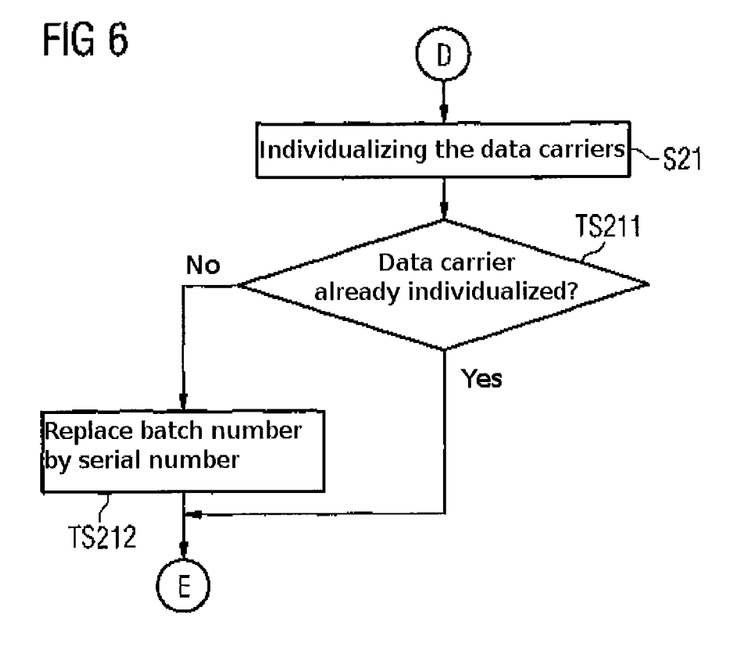
Figure 7:
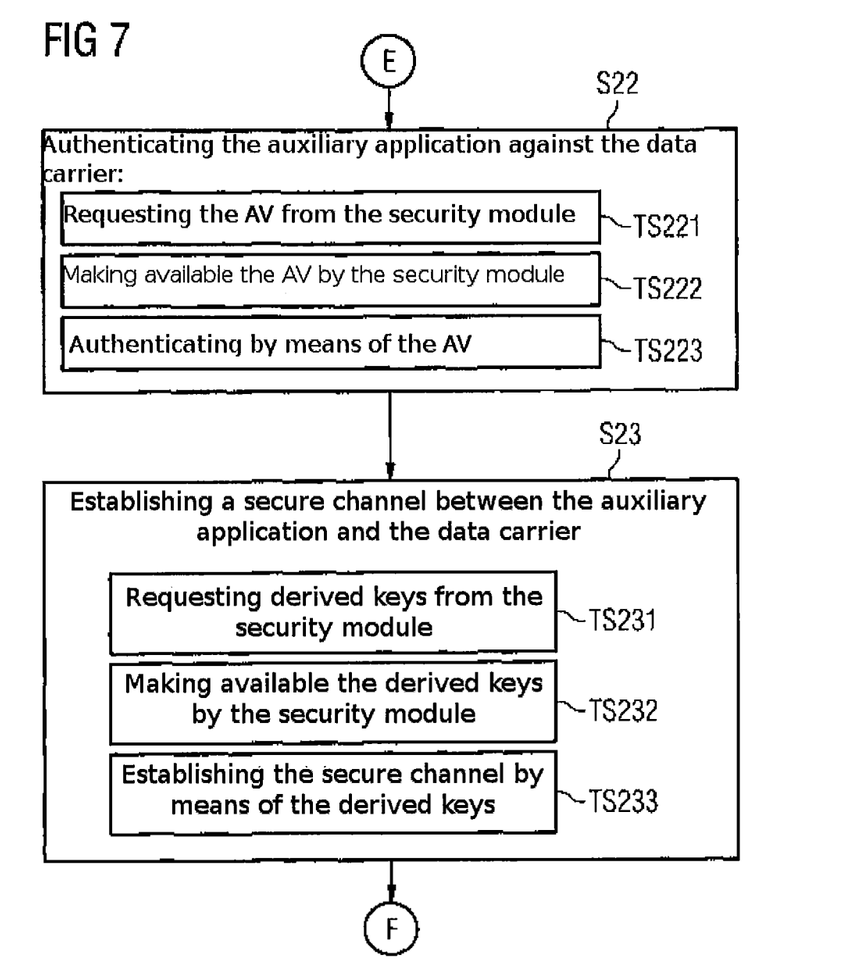

With reference to FIGS. 6 and 7, there are now described individual steps which are effected by commands of the executed completion script 300. If, in the following, a formulation suggests that the auxiliary application 210 acts of its own accord, for example "the auxiliary application 210 requests", this means that the corresponding request is caused through a command of the completion script 300 by the auxiliary application 210 having started and executing the completion script 300.

In step S21, in a phase upstream the actual completion of the data carrier 10, 11, 12, 13, the data carrier 10, 11, 12, 13 to be completed is individualized, if this has not already been done. This step is necessary in order to prevent that by means of a correct "recorded" completion process, which has been carried out for a data carrier 10 of the batch, identical data carriers 10, 11, 12, 13 of a batch are likewise—identically—completed. Here it is to be noted that data carriers of the same batch have an identical batch number. The batch number of a data carrier is employed to calculate an authentication value AV required for authentication against the data carrier. Accordingly, for the data carriers of a batch—as long as these respectively have the same batch number—the same AV value is sufficient for authentication. This makes it possible for a recorded completion process, including authentication, to be applied repeatedly. But this is to be prevented in the case of the delegated completion. In substep TS211, the completion script 300 checks whether a relevant data carrier 10, 11, 12, 13 has already been individualized, for example because this data carrier 10, 11, 12, 13 has already been personalized in a previous production phase. If not, the data carrier 10, 11, 12, 13 is individualized by the batch number stored in the data carrier 10, 11, 12, 13 being replaced by a serial number individual for each data carrier, as this is indicated in step TS212.

Figure 4:
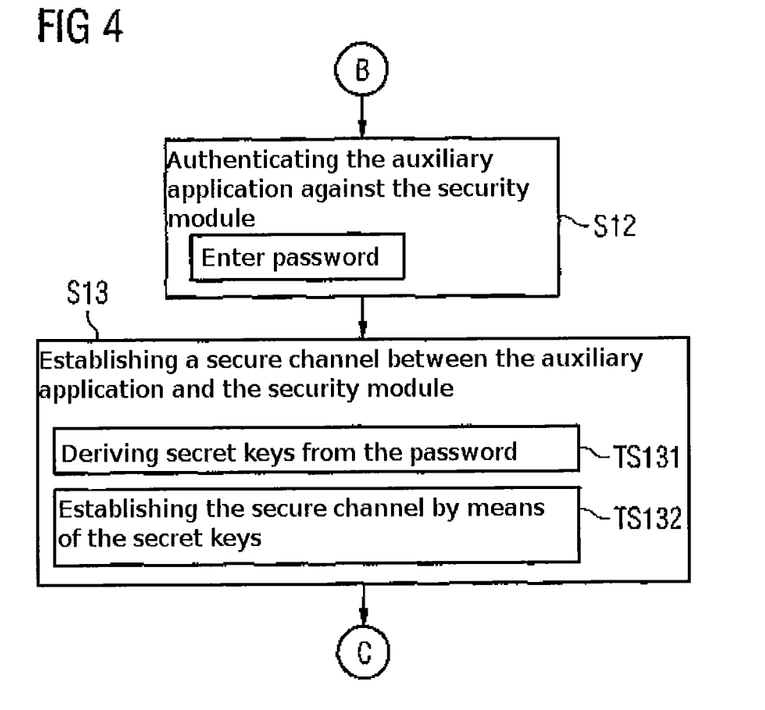

For making available a secured environment between the auxiliary application 210 and the data carrier 10, 11, 12, 13, as shown in FIG. 7, a similar process is used as it has been described above with reference to the security module 100 (cf. FIG. 4). In step S22, the auxiliary application 210 authenticates itself against the data carrier 10, 11, 12, 13. The authentication value AV individual for each data carrier and necessary for this authentication is requested by the auxiliary application from the management application 110 on the security module 100 in substep TS 221. Based on predeterminations in the authorization data set 410, the management application 110 determines the AV and makes this available to the auxiliary application 210 in substep TS222, before the auxiliary application 210 finally authenticates itself against the data carrier 10, 11, 12, 13 in substep TS223 by means of the obtained AV.

For establishing a secured channel between the auxiliary application 210 and the data carrier 10, 11, 12, 13, which is established in step S23, the auxiliary application 210 requests in substep TS231 from the management application 110 the keys necessary therefor derived from a data carrier key stored on the security module 100 as a part of the authorization data set 410. This management application determines the corresponding keys with recourse to the authorization data set 410 and makes them available to the auxiliary application 210 in substep TS232. The auxiliary application 210 establishes the secure communication connection to the data carrier 10, 11, 12, 13 by means of these derived keys in substep TS233. Step S23 is optional, in particular because the completion data sets transmitted in the following step S24 can already be encrypted—independent of an encryption of the transmission channel.

Figure 8:
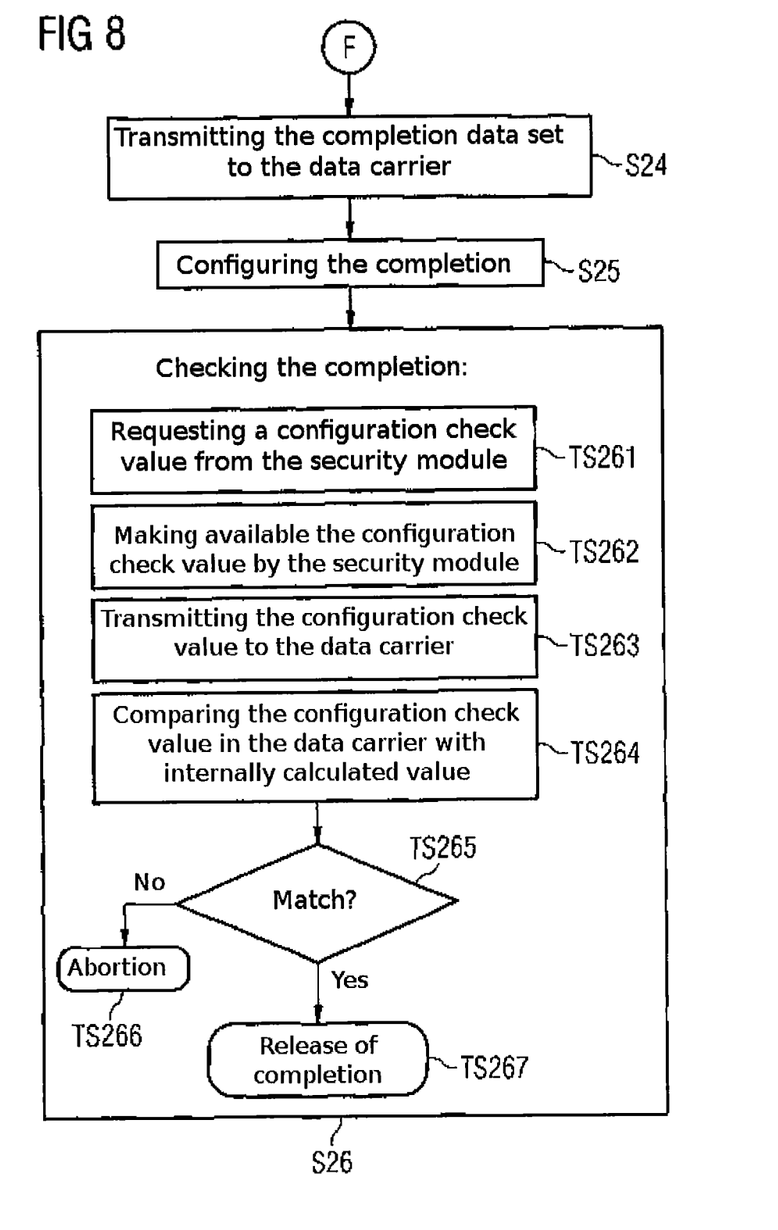

Now, all preparations are made in order to carry out the actual completion of the data carrier 10, 11, 12, 13, as this is described with reference to FIG. 8. In step S24, the completion data set 310 is transmitted by means of a command of the completion script 300 to the data carrier 10, 11, 12, 13 and stored there for example in the EEPROM memory. Where appropriate, this memory has been, as a precautionary measure, completely deleted before. It is not shown in the Figure that after step S24 the data carrier is restarted preferably by means of a reset signal (warm reset) and analogous to step S22 an authentication is carried out which, however, is now effected against the completed (JAVA card) operating system of the data carrier. Subsequently, the operating system of the data carrier 10, 11, 12, 13, which has been updated and completed by means of the completion data 310, is configured in step S25.

Finally, in step S26, this configuration is checked based on the predeterminations in the authorization data set 410. For this purpose, the auxiliary application 210 requests in substep TS261 from the management application 110 on the security module 100 a corresponding configuration check value. The management application 110 creates this check value according to the specification in the authorization data set 410 and makes available the corresponding value to the auxiliary application 210 in substep TS262. Data components individual for each data carrier can enter into the calculation of the configuration check value. The auxiliary application 210 transmits the received configuration check value in substep TS263 to the data carrier 10, 11, 12, 13. There, the received configuration check value is compared, in substeps TS264, TS265, with a data-carrier-internal check value calculated over the current configuration. Only when the two check values match, i.e. the data carrier 10, 11, 12, 13 has been configured according to the predeterminations in the authorization data set 410, the corresponding configuration in the data carrier 10, 11, 12, 13 is released in substep TS267, and the counter in the authorization data set 410 relating to the admissible number of completions is reduced by one by the management application 110. Otherwise, the completion process is unsuccessfully aborted. The release of the completion means that the completed data carrier 10, 11, 12, 13 is ready for further production steps, for example an initialization or a subsequent personalization for a future user.

The invention claimed is:

1. A method comprising:
providing on a security module connected with a completion apparatus different authorization data sets as well as a management application that manages the different authorization data sets, wherein each of the authorization data sets respectively specifies exactly one completion and is respectively associated with exactly one completion data set;
connecting at least one portable data carrier to the completion apparatus, each data carrier being a chip card; and
completing the at least one portable data carrier by incorporating a completion data set present on the completion apparatus into the at least one data carrier,
wherein the management application monitors the completion of the at least one data carrier according to a specification in a selected authorization data set, and
wherein the selected authorization data set specifies at least one of:
the maximum number of data carriers to be completed with the completion data set associated with the authorization data set, and
the time period within which this completion can take place, and
wherein the completion is carried out only when the specified maximum number has not yet been reached or the specified time period is given.

2. The method according to claim 1, wherein the selected authorization data set uniquely specifies the completion data set to be incorporated as well as completion commands incorporating the completion data set into the at least one data carrier by uniquely associating with the selected authorization data set a completion script made available on the completion apparatus, which completion script predetermines the completion data set as well as the completion commands.

3. The method according to claim 1, wherein the selected authorization data set specifies the security module and is made available on the security module only when the security module matches the specification in the authorization data set.

4. The method according to claim 1, wherein the selected authorization data set specifies the at least one data carrier and the completion is only carried out when the at least one data carrier matches the specification in the authorization data set.

5. The method according to claim 1, wherein an auxiliary application executable on the completion apparatus, further comprising the steps:
transmitting an authorization data script comprising the selected authorization data set as well as the completion script to the completion apparatus;
transmitting the authorization data set from the completion apparatus to the security module by executing the authorization data script by the auxiliary application; and
incorporating the completion data set from the completion apparatus into the at least one data carrier by executing the completion script by the auxiliary application.

6. The method according to claim 5, wherein the completion script and the selected authorization data set are encrypted prior to the transmission to the completion apparatus.

7. The method according to claim 6, wherein the completion script is decrypted, prior to the carrying out by the auxiliary application, by the auxiliary application.

8. The method according to claim 6, wherein the selected authorization data set is decrypted, after the transmission to the security module, by the management application.

9. The method according to claim 5, wherein the auxiliary application authenticates itself against the security module and the at least one data carrier and wherein a data communication from the completion apparatus to the security module or to the at least one data carrier is carried out in an encrypted manner.

10. The method according to claim 1, wherein the management application predetermines a configuration of the completion of the data carrier based on configuration predeterminations in the selected authorization data set.

11. The method according to claim 1, wherein the security module is personalized prior to the making available.

12. The method according to claim 1, wherein the at least one data carrier is individualized prior to the incorporation of the completion data set.

13. A hardware device comprising:
a security module configured to monitor a method for completing at least one portable data carrier, the method incorporating a completion data set present on a completion apparatus connectable with the security module into the at least one data carrier, each data carrier comprising a chip card operating system, the security module being configured to take up different authorization data sets,
wherein each of the authorization data sets specifies exactly one completion and is respectively associated with exactly one completion data set, and
the security module comprises a management application configured to manage different authorization data sets and to monitor the completion of the at least one data carrier according to a specification in a selected authorization data set, and
wherein the selected authorization data set specifies at least one of:
the maximum number of data carriers to be completed with the completion data set associated with the authorization data set, and
the time period within which this completion can take place, and
wherein the completion is carried out only when the specified maximum number has not yet been reached or the specified time period is given.

14. A system comprising:
a security module configured to take up different authorization data sets, and comprising a management application configured to manage the different authorization data sets, wherein each of the authorization data sets is associated with exactly one completion script and specifies exactly one completion;
a completion apparatus having an auxiliary application that incorporates the different authorization data sets into the security module, the completion apparatus also having different completion scripts, each comprising a completion data set and completion commands;
at least one portable data carrier according to ISO 7816 removably connectable with the completion apparatus;
wherein the auxiliary application incorporates a corresponding completion data set into the at least one data carrier when the at least one data carrier is connected to the completion apparatus by executing a selected completion script, thereby completing the operating system of the at least one portable data carrier;
wherein the management application monitors the completion according to a specification in the selected authorization data set associated with the completion script, and
wherein the selected authorization data set specifies at least one of:
the maximum number of data carriers to be completed with the completion data set associated with the authorization data set, and
the time period within which this completion can take place, and
wherein the completion is carried out only when the specified maximum number has not yet been reached or the specified time period is given.

\* \* \* \* \*